United States Patent [19]

Tanaka

[11] Patent Number: 5,448,755
[45] Date of Patent: Sep. 5, 1995

[54] OSCILLATION SCHEME FOR A SELECTIVE CALLING RECEPTION APPARATUS

[75] Inventor: Yasunari Tanaka, Yokohama, Japan

[73] Assignee: Matsushita Electric Industrial Co., Ltd., Osaka, Japan

[21] Appl. No.: 870,416

[22] Filed: Apr. 17, 1992

[30] Foreign Application Priority Data

May 7, 1991 [JP] Japan .................. 3-101296

[51] Int. Cl.[6] .............................. H04B 1/16
[52] U.S. Cl. .................. 455/38.3; 455/256; 455/343
[58] Field of Search ............... 455/38.2, 38.3, 256, 455/315, 343; 340/825.44; 370/66

[56] References Cited

U.S. PATENT DOCUMENTS

| Re. 27,044 | 2/1971 | Rothenbuhler | 455/38.2 |
|---|---|---|---|
| 2,300,081 | 10/1942 | White | 455/38.2 |
| 3,069,657 | 12/1962 | Green, Jr. et al. | 455/38.2 |
| 4,361,896 | 11/1982 | Garner | 455/38.2 |
| 4,511,887 | 4/1985 | Fiore | 455/38.2 |

FOREIGN PATENT DOCUMENTS

| 60-13588 | 4/1985 | Japan | |
|---|---|---|---|
| 2005633 | 1/1990 | Japan | 455/38.3 |
| 0023725 | 1/1991 | Japan | 455/38.3 |
| 0062634 | 3/1991 | Japan | 455/38.3 |

*Primary Examiner*—Edward F. Urban
*Attorney, Agent, or Firm*—Stevens, Davis, Miller & Mosher

[57] ABSTRACT

Disclosed is a selective calling reception apparatus which comprises an intermittent reception oscillator for intermittently receiving a selective calling signal from a base station and a signal processing oscillator for processing the selective calling signal, in which the oscillation of the signal processing oscillator is controlled in accordance with a timing signal generated on the basis of the oscillation output of the intermittent reception oscillator. Accordingly, when the transmission rate of a selective calling signal is made high, it will do to make only the oscillation frequency of the signal processing oscillator high and it is not necessary to make the oscillation frequency of the intermittent reception oscillator high to thereby make is not required to be made high, so that the current consumption at the stand-by time does not increase.

15 Claims, 4 Drawing Sheets

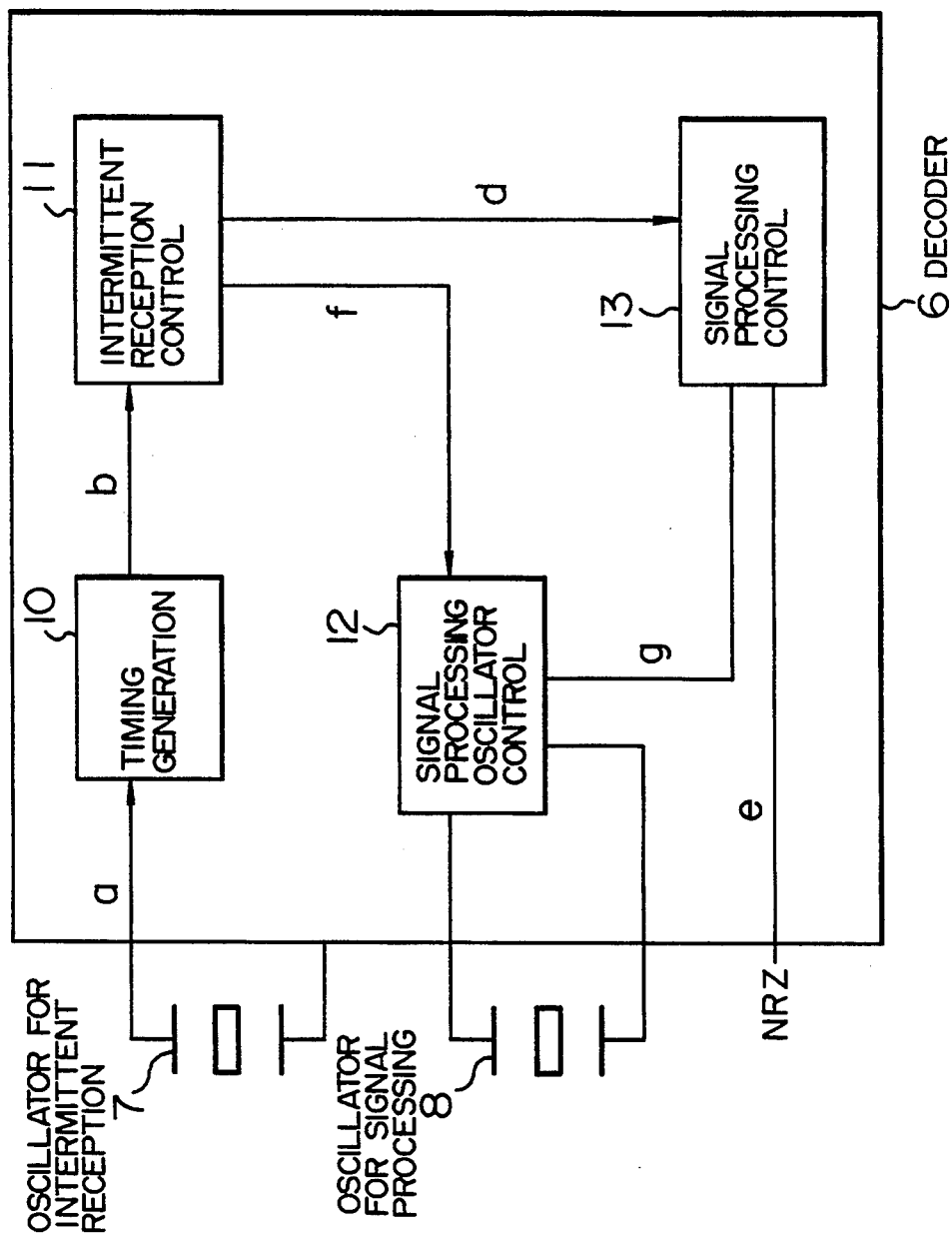
F I G. 1

OSCILLATION SCHEME FOR A SELECTIVE CALLING RECEPTION APPARATUS

BACKGROUND OF THE INVENTION

The present invention generally relates to a selective calling reception apparatus, and particularly relates to an oscillator circuit for use in a selective calling reception apparatus in which current consumption can be reduced.

Conventionally, such a selective calling reception apparatus does not have a plurality of oscillators including an oscillator for intermittent reception and an oscillator for signal processing, but has such a configuration as shown in FIG. 4, in which a decoder 6 has a timing generation circuit 2, an intermittent reception control portion 3, and a signal processing control portion 4, so that the intermittent reception control portion 3 is driven by an intermittent reception driving signal b generated by the timing generation circuit 2 which is driven by a clock a generated by a single oscillator 1, and the signal processing control portion 4 is driven by a signal processing driving signal c generated by the timing generation circuit 2 and a signal processing timing signal d generated by the intermittent reception control portion 3 to thereby take a selective calling signal (hereinafter, referred to as an NRZ signal) from a base station into the signal processing control portion 4 as a reception signal.

In the conventional selective calling reception apparatus as described above, however, when the transmission rate of the reception NRZ signal is made high, it is necessary to make the oscillation frequency of the oscillator high in proportion to the transmission rate to thereby keep the resolution for the reception NRZ signal. There has been therefore a problem that if the oscillation frequency of the oscillator is made high in proportion to the transmission rate as described above, the oscillation current increases due to the characteristics of the oscillator to increase power consumption in the stand-by time in the selective calling reception apparatus to thereby shorten the battery life. There has been a further problem that it is necessary to keep the precision of oscillation to the same extent as that before the oscillation frequency is made high.

SUMMARY OF THE INVENTION

It is therefore an object of the present invention to solve the foregoing problems in the conventional art.

It is another object of the present invention to provide an improved selective calling reception apparatus in which current consumption is small even in the case where the transmission rate of a reception NRZ signal is made high.

In addressing the above problems, the selective calling reception apparatus according to the present invention may provide a first oscillator for intermittently receiving a selective calling signal from a base station and a second oscillator for generating a signal for decoding the selective calling signal so that the operation of oscillation of the second oscillator is controlled on the basis of the output of the first oscillator.

According to the present invention, therefore, the first oscillator for intermittent reception is made to stand by so that a reception NRZ signal is decoded on the basis of the output of the second oscillator for signal processing which is controlled by the first oscillator. It is therefore possible to provide a selective calling reception apparatus which can operate with a small stand-by current stably and independently of the transmission rate of the reception NRZ signal even if the transmission rate is made high.

Further, the second oscillator for signal processing can be constituted by an oscillator having lower oscillation frequency than that of the first oscillator for intermittent reception.

BRIEF DESCRIPTION OF THE DRAWINGS

FIG. 1 is a block diagram showing the configuration of an embodiment of the selective calling reception apparatus according to the present invention;

DESCRIPTION OF THE PREFERRED EMBODIMENT

An embodiment of the present invention will be described with reference to FIGS. 1 through 3.

FIG. 1 is a block diagram showing the selective calling reception apparatus according to the present invention.

Figure 4:
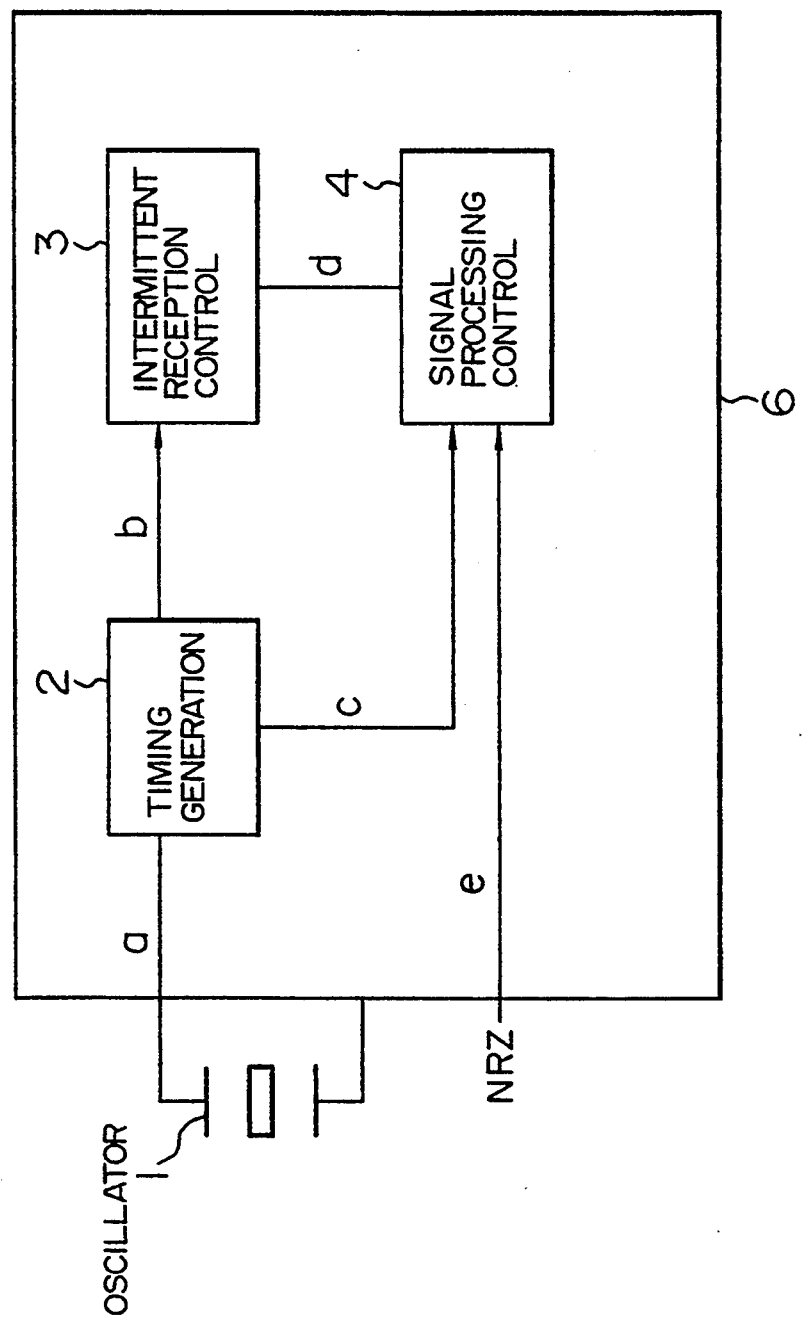
FIG. 4 is a block diagram showing the conventional selective calling reception apparatus.

In FIG. 1, a decoder 6 is constituted by a timing generation circuit 10, an intermittent reception control portion 11, and a signal processing control portion 13, those constituent components 6, 10, and 11 having the same functions as those constituent components of FIG. 4. A signal processing oscillator control portion 12 controls the oscillation of an oscillator 8 for signal processing for decoding on the basis of a signal processing oscillator control signal f generated from the intermittent reception control portion 11. The oscillation frequency of the oscillator 8 for signal processing is made high/low in accordance with the frequency of a reception NRZ signal.

Figure 2:
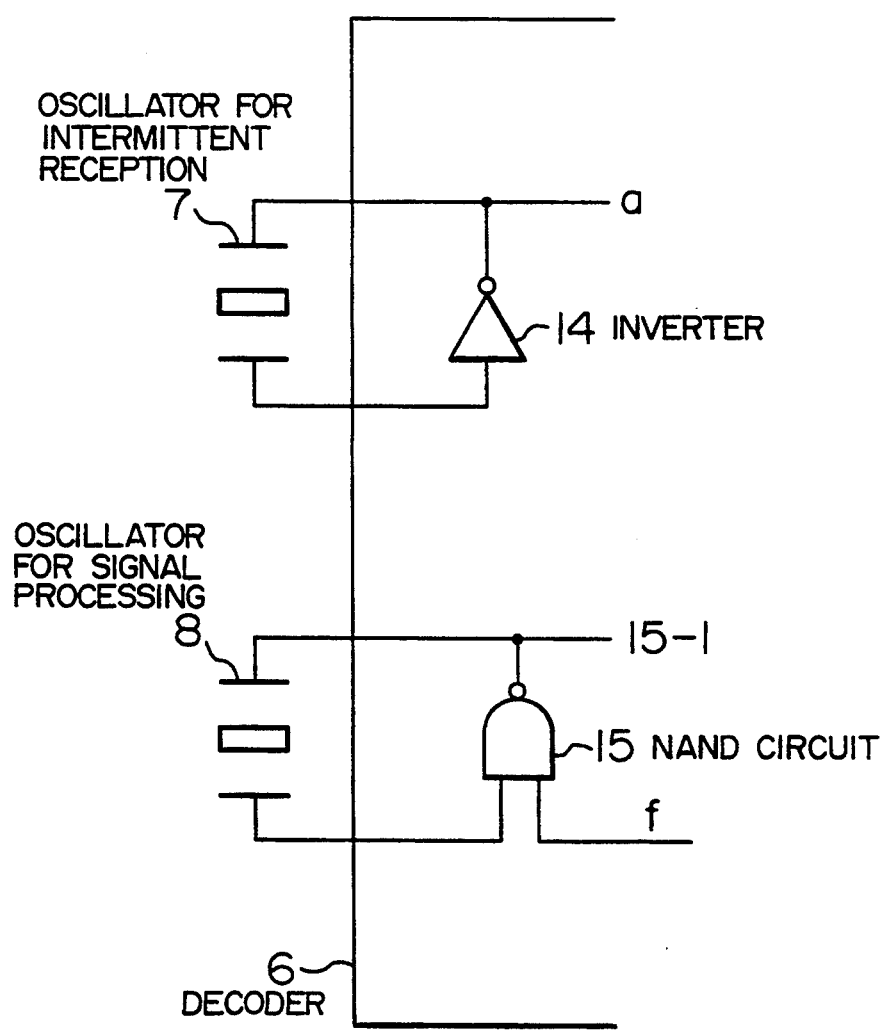
FIG. 2 is a diagram showing in detail the oscillation portion of the selective calling reception apparatus of FIG. 1.

FIG. 2 shows means for realizing the oscillator for signal processing. Although the oscillation portion of the oscillator 7 for intermittent reception is constituted by an invertor 14 in the same manner as that in an ordinary crystal oscillator of a C-MOS-IC, the oscillation portion of the oscillator 8 for signal processing is constituted by an NAND circuit 15 because the oscillation control signal f for controlling oscillation is applied thereto.

Next, the operation of this embodiment will be described with reference to a timing chart of FIG. 3.

Figure 3:
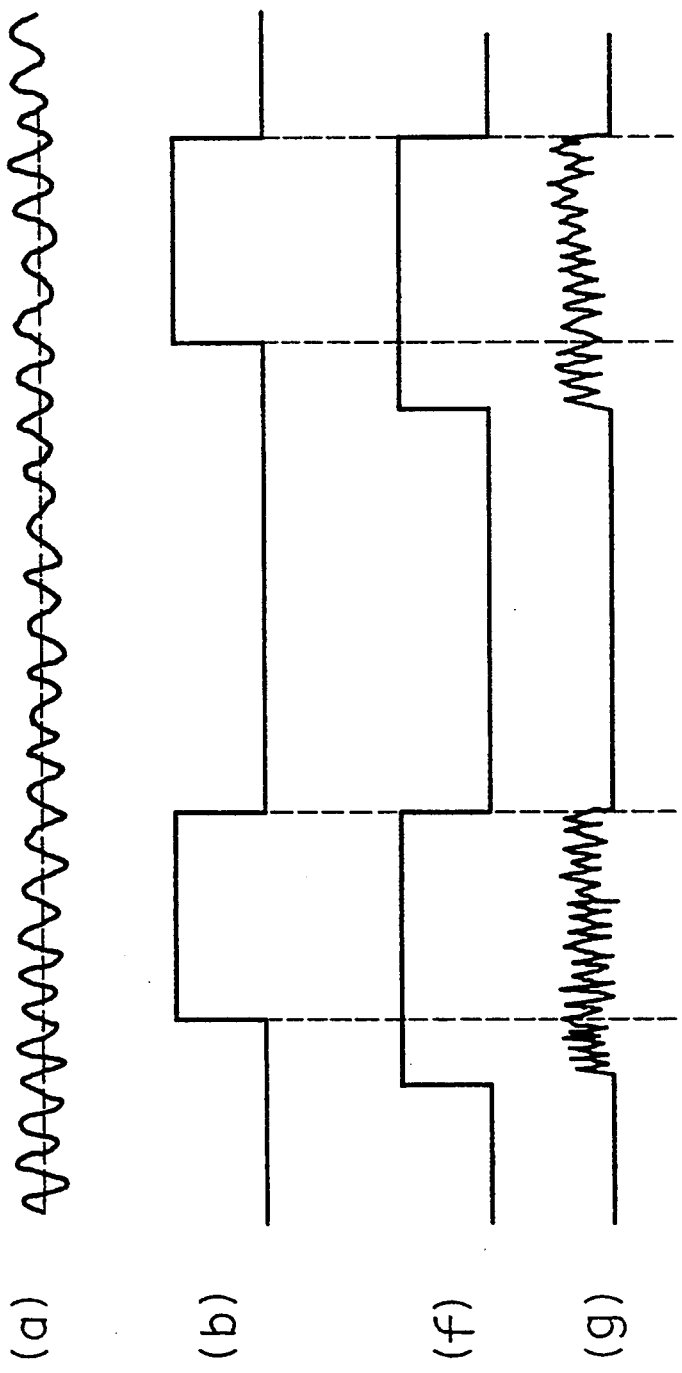
FIG. 3 is a waveform diagram for explaining the operation of the embodiment of the selective calling reception apparatus according to the present invention.

The oscillation timing of the oscillator 7 for intermittent reception is made to cause continuous oscillation as shown in the waveform (a) of FIG. 3. An intermittent reception timing signal is generated by the timing generation circuit 10 by utilizing the above-mentioned oscillation of the oscillator 7 as shown in the waveform (b) of FIG. 3. Further, an oscillation control signal for the oscillator 8 for signal processing is generated by the intermittent reception control portion 11 as shown in the waveform (f) of FIG. 3. Therefore, the oscillation frequency of the oscillator 7 for intermittent reception may be set to a low value which suffices to control intermittent reception, and, the oscillation frequency is not therefore affected by the transmission rate of a reception NRZ signal, so that the current consumption in the stand-by time does not increase. The level of the applied oscillation control signal f is made "H" when the oscillator 8 for signal processing is to be oscillated, while made "L" when the oscillator 8 for signal processing is not to be oscillated, as shown in the waveform (f) of FIG. 3.

The oscillation timing of the oscillator 8 for signal processing is to made to cause intermittent oscillation in synchronism with the signal processing oscillator control signal f as shown in the waveform (g) of FIG. 3, and the signal processing control portion 13 performs signal processing by use of the intermittent oscillation output (g) and a signal processing timing signal d from the intermittent reception control portion 11. Consequently, the oscillation frequency of the oscillator 8 for signal processing increases/decreases in proportion to the transmission rate of the reception NRZ signal. The precision of the oscillation frequency of the oscillator 8 for signal processing is not required to be so high but it may be lower than that of the intermittent receiving oscillator 7.

As described above, the present invention has excellent effects in that the oscillator for intermittent reception and the oscillator for signal processing are provided separately from each other so that the current consumption in the stand-by time can be made small even if the transmission rate of a reception NRZ signal is made high, and in that the precision of the oscillation of the oscillator for signal processing is not required to be made high even when the oscillation frequency is made high.

I claim:

1. A method of controlling a selective calling reception apparatus, the method comprising:
   (a) providing a first oscillator means;
   (b) employing said first oscillator means to generate a first output signal;
   (c) controlling intermittent reception, by the selective calling reception apparatus, of a selective calling signal transmitted from a base station in accordance with the first output signal;
   (d) providing a second oscillator means;
   (e) controlling the second oscillator means to generate a second output signal for use in decoding the selective calling signal in accordance with said first output signal of the first oscillator means; and
   (f) controlling the decoding of the selective calling signal in accordance with the second output signal.

2. A method as in claim 1, wherein the first output signal is a continuous oscillation signal.

3. A method as in claim 1, wherein the first output signal has a frequency which is independent of a transmission rate of the selective calling signal.

4. A method as in claim 1, wherein step (e) comprises:
   (i) generating an oscillation control signal in accordance with the first output signal; and
   (ii) controlling the second oscillator means in accordance with the oscillation control signal.

5. A method as in claim 4, wherein the oscillation control signal oscillates between an H level and an L level.

6. A method as in claim 1, wherein step (e) comprises controlling an oscillation timing of the second oscillation means in accordance with said first output signal.

7. A method as in claim 1, wherein an oscillation frequency of the first oscillator means is higher than an oscillation frequency of the second oscillator means.

8. A method as in claim 1, wherein a precision of an oscillation frequency of the first oscillator means is higher than a precision of an oscillation frequency of the second oscillator means.

9. A method as in claim 1, wherein:
   the first oscillator means has a first oscillation frequency which is adapted to control the intermittent reception of the selective calling signal and which is independent of a transmission rate of the selective calling signal; and
   the second oscillator means has a second oscillation frequency which is higher than the first oscillation frequency and which is varied in accordance with the transmission rate of the selective calling signal.

10. A method of controlling a selective calling reception apparatus, the method comprising:
    (a) providing a first oscillator means;
    (b) employing said first oscillator means to generate a first output signal;
    (c) generating an intermittent reception timing signal in accordance with the first output signal;
    (d) controlling intermittent reception of a selective calling signal by a signal processing control circuit in accordance with said intermittent reception timing signal, said selective calling signal being transmitted from a base station;
    (e) providing a second oscillator means;
    (f) controlling the second oscillator means to generate a second output signal for use in decoding the selective calling signal in accordance with the first output signal of the first oscillator means; and
    (g) controlling the decoding of the selective calling signal in accordance with the second output signal.

11. A method of controlling a selective calling reception apparatus, the method comprising:
    (a) providing a first oscillator means;
    (b) employing said first oscillator means to generate a first output signal;
    (c) controlling intermittent reception, by the selective calling reception apparatus, of a selective calling signal transmitted from a base station in accordance with the first output signal;
    (d) providing a second oscillator means;
    (e) generating an oscillation control signal in accordance with the first output signal, the oscillation control signal oscillating between an H level and an L level;
    (f) controlling the second oscillator means to generate a second output signal for use in decoding the selective calling signal in accordance with said first output signal of the first oscillator means by (i) controlling the second oscillator means to oscillate while the oscillation control signal is at the H level and (ii) controlling the second oscillator means not to oscillate when the oscillation control signal is at the L level; and
    (g) controlling the decoding of the selective calling signal in accordance with the second output signal.

12. A method of controlling a selective calling reception apparatus, the method comprising;
    (a) providing a first oscillator means;
    (b) employing the first oscillator means to generate a continuous oscillation signal having a frequency which is independent of a transmission rate of a selective calling signal output by a base station;

(c) controlling intermittent reception, by the selective calling reception apparatus, of the selective calling signal transmitted from the base station in accordance with the continuous oscillation signal;

(d) providing a second oscillator means;

(e) controlling the second oscillator means to generate an output signal for use in decoding the selective calling signal in accordance with the continuous oscillation signal; and (f) controlling the decoding of the selective calling signal in accordance with the output signal.

13. A method as in claim 12, wherein the frequency of the continuous oscillation signal is higher than an oscillation frequency of the second oscillator means.

14. A method as in claim 12, wherein a precision of the frequency of the continuous oscillation signal is higher than a precision of an oscillation frequency of the second oscillator means.

15. A method as in claim 12, wherein:
the frequency is adapted to control the intermittent reception of the selective calling signal; and
the second oscillator means has an oscillation frequency which is higher than the frequency of the continuous oscillation signal and which is varied in accordance with the transmission rate of the selective calling signal.

* * * * *